US011171971B2

(12) United States Patent
Norton et al.

(10) Patent No.: US 11,171,971 B2
(45) Date of Patent: Nov. 9, 2021

(54) SHADOW PROFILE AND ENVIRONMENT FOR MOBILE SECURITY

(71) Applicant: Verizon Patent and Licensing Inc., Arlington, VA (US)

(72) Inventors: Kevin Norton, Moorestown, NJ (US); Bruno Mendez, Springfield, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 16/426,043

(22) Filed: May 30, 2019

(65) Prior Publication Data

US 2020/0382526 A1 Dec. 3, 2020

(51) Int. Cl.
*H04L 29/06* (2006.01)
*G06F 16/901* (2019.01)

(52) U.S. Cl.
CPC ...... *H04L 63/1416* (2013.01); *G06F 16/9017* (2019.01); *H04L 63/1441* (2013.01); *H04L 63/20* (2013.01)

(58) Field of Classification Search
CPC ............. G06F 16/9017; G06F 21/6254; H04L 63/1441; H04L 63/20; H04L 63/1416; H04L 63/1408
IPC .............. G06F 21/53,16/9017; H04L 63/1441, 63/20
See application file for complete search history.

(56) References Cited

U.S. PATENT DOCUMENTS

| 8,984,640 | B1* | 3/2015 | Emigh et al. | ........... G06F 21/56 |
| 9,092,625 | B1* | 7/2015 | Kashyap et al. | ........ G06F 21/00 |
| 10,534,906 | B1* | 1/2020 | Paithane et al. | ........ G06F 21/53 |
| 2001/0037316 | A1* | 11/2001 | Shiloh | ................ G06Q 30/0601 |
| | | | | 705/74 |
| 2007/0250930 | A1* | 10/2007 | Aziz | ................... G06F 9/45533 |
| | | | | 726/24 |
| 2008/0301139 | A1* | 12/2008 | Wang | .................. H04L 63/1441 |
| 2015/0033305 | A1* | 1/2015 | Shear | ................. G06F 21/6218 |
| | | | | 726/6 |
| 2015/0172305 | A1* | 6/2015 | Dixon | ................ H04L 63/1433 |
| | | | | 726/23 |

(Continued)

FOREIGN PATENT DOCUMENTS

WO WO-2006135903 A2 * 12/2006 ............. G06F 21/53

OTHER PUBLICATIONS

Sebastian Gajek and Ahmad-Reza Sadeghi (Proceedings of the Third IFIP WG 9.2, 9.6/11.6, 11.7/FIDIS International Summer School on the Future of Identity in the Information Society Privacy and Identity 2007 "The Future of Identity in the Information Society", p. 23-35. (Year: 2007).*

*Primary Examiner* — John B King (57) ABSTRACT

A user device receives a communication that contains a link or an attachment and sends the link or the attachment to a virtual user device stored externally with respect to the user device. Actions to be performed with respect to the user device are executed on the virtual user device. The virtual user device determines whether the link or attachment is malicious. The user device receives an indication of whether the link or the attachment is malicious and displays an indication that the link or the attachment is safe to open when the link or attachment is not malicious.

20 Claims, 6 Drawing Sheets

(56) References Cited

U.S. PATENT DOCUMENTS

| | | | |
|---|---|---|---|
| 2016/0044054 A1* | 2/2016 | Stiansen | H04L 63/1416 |
| | | | 726/24 |
| 2016/0156656 A1* | 6/2016 | Boggs | H04L 63/1425 |
| | | | 726/25 |
| 2016/0330219 A1* | 11/2016 | Hasan | G06N 5/025 |
| 2017/0244672 A1* | 8/2017 | Shulman | H04L 12/4633 |
| 2017/0293906 A1* | 10/2017 | Komarov | H04L 63/1416 |
| 2018/0013547 A1* | 1/2018 | Giura | H04L 63/00 |
| 2018/0150645 A1* | 5/2018 | Toshok | G06F 21/6254 |
| 2020/0380164 A1* | 12/2020 | Yoho et al. | G06F 21/62 |

* cited by examiner

SHADOW PROFILE AND ENVIRONMENT FOR MOBILE SECURITY

BACKGROUND

Millions of users fall victim to phishing, malware, and ransomware attacks each year. A heavy burden exists on users to identify malicious activities, such as bad links, emails, executable, and websites, which may spread the attacks. The attacks constitute a significant economic loss in both consumer and corporate settings in the form of time spent in remediation, data loss, and money spent in paying ransoms.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein represent a user device as a shadow device instantiated in a virtualized manner in a cloud. The shadow device may be identical in model, memory, applications, and data to the user device. The shadow device may be instrumented to detect malicious activity and fake data. In addition, the shadow device may be virtually firewalled to protect the user device from cyber attacks such as phishing, malware, and ransomware attacks.

Implementations described herein relate to methods, devices, and systems for creating a shadow device that emulates a user device. The shadow device may include a virtual device that is stored or implemented in the cloud. The shadow device may be identical to the user device and actions performed on the user device may be emulated by the shadow device so that the user and the user device may be synchronized. For example, any interactions performed by a user on the user device may be replicated by the shadow device. The shadow device may be used to open suspicious links or attachments received by the user device to protect the user device from malicious activity. In addition, the shadow device may store "dummy" data or false data that may be provided to third parties to protect the identity and other information associated with a user of the user device.

Figure 1:
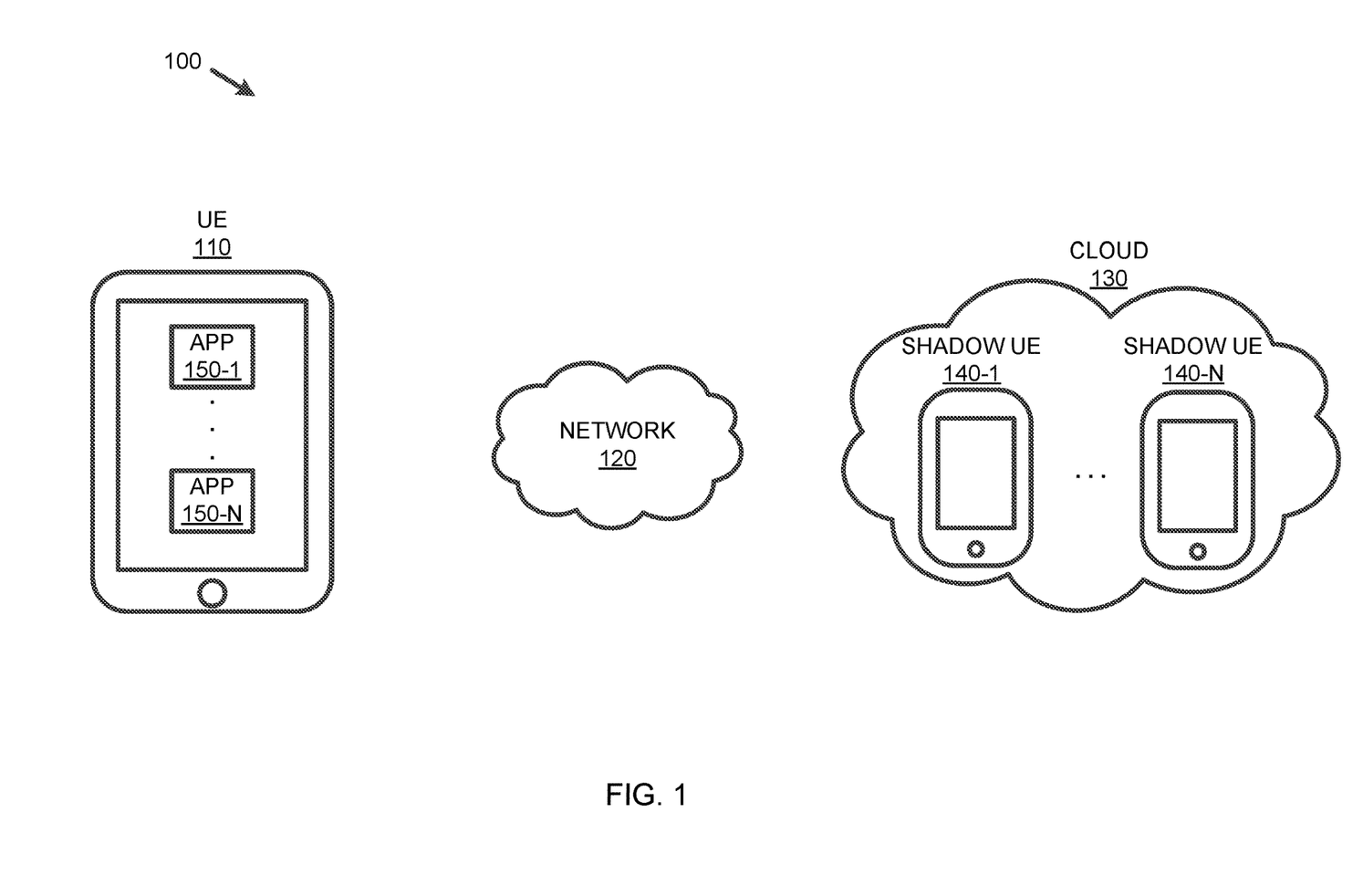
FIG. 1 is a diagram illustrating an exemplary environment in which systems and/or methods, described herein, may be implemented.

FIG. 1 is a diagram illustrating an exemplary environment 100 in which systems and/or methods, described herein, may be implemented. As shown in FIG. 1, environment 100 may include a user equipment (UE) 110, a network 120, and a cloud 130. Cloud 130 may store shadow UEs 140-1 to 140-N (wherein N may be equal to any integer greater than or equal to 1, referred to herein individually as shadow UE 140 or 140-x and collectively as shadow UEs 140). UE 110 may store applications (apps) 150-1 to 150-N (wherein N may be equal to any integer greater than or equal to 1, referred to herein individually as app 150 or 150-x and collectively as apps 150).

UE 110 may include any device capable of communicating via a network. For example, UE 110 may correspond to a mobile communication device (e.g., a mobile phone, a smart phone, a personal digital assistant (PDA), or a wireline telephone), a computer device (e.g., a laptop computer, a tablet computer, or a personal computer, a notebook, a netbook, a wearable computer (e.g., a wrist watch, eye glasses, etc.)), a gaming device, a music playing device, a home appliance device, a home monitoring device, a set top box, a computation device onboard a machine (a smart car, drone, robot, etc.), a computation terminal (e.g., a kiosk, an automatic teller machine (ATM), etc.), or another type of communication or computation device.

UE 110 may store one or more apps 150. Apps 150 may allow a user to interact with a number of providers via UE 110. App 150 may include, for example, an Internet browsing app, a text messaging app, an email app, a social media app, a two-factor authorization app, a gaming app, an online shopping app, a navigation app, an app to allow a user to access information associated with shadow UE 140, or any other type of app.

Network 120 may generally include one or more wired, wireless and/or optical networks that are capable of receiving and transmitting data, voice and/or video signals, including multi-media signals that may include voice, data and video information. For example, network 120 may include one or more access networks, Internet Protocol (IP) multimedia subsystem (IMS) networks, evolved packet core (EPC) networks, or other networks. The access network may include one or more wireless networks and may include a number of transmission towers for receiving wireless signals and forwarding the wireless signals toward the intended destinations. The network may include a wireless communications network that connects subscribers (e.g., UE 110) to other portions of environment 100 (e.g., cloud 130). In one example, the access network may employ other cellular broadband network standards such as 3rd Generation Partnership Project (3GPP) fifth generation (5G) and future standards. In another implementation, network 120 may include a long-term evolution (LTE) network. Network 120 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

Cloud 130 may include a 5G multi-access edge computing (MEC) network architecture that enables cloud computing capabilities and an Information Technology (IT) service environment at the edge of a cellular network, such as network 120. MEC technology may be designed to be implemented at cellular base stations or other edge nodes and may enable flexible and rapid deployment of new applications and services for customers. By running applications and performing related processing tasks closer to the cellular customer, network congestion may be reduced and application performance may improve. Cloud 130 may store one or more shadow UEs 140 and information associated with shadow UEs 140, such as a database of safe and/or malicious links (not shown). In other implementations, cloud 130 may interface with a fourth generation (4G) network, such as an LTE network.

Shadow UE 140 may include a virtual UE that is a replica of UE 110. Shadow UE 140 may be implemented in response to a user of UE 110 downloading a mobile application on UE 110 and performing a registration process. As discussed in connection with FIG. 5, the registration process may include configuring the type of data that shadow UE 140 sends to apps 150. Shadow UE 140 may emulate UE 110 so that actions performed on UE 110 are performed on shadow UE 140 and shadow UE 140 may be synchronized with UE 110. Data received at UE 110 and sent by UE 110 may be automatically streamed to shadow UE 140 so that shadow UE 140 may mirror the actions performed on UE 110. For example, if a user of UE 110 is accessing app 150, the functions performed by the user with respect to app 150 are performed on shadow UE 140 and saved on cloud 130. The data exchanged between UE 110 and app 150 may be automatically streamed to cloud 130 so that shadow UE 140 may mirror UE 110. In addition, a current state of UE 110 may be recorded and saved on cloud 130. For example, before a link is opened on shadow UE 140, a "snapshot" of shadow UE 140 may be taken. In this way, if the link is malicious, the state of UE 110 before the link was opened may be maintained and UE 110 may continue operating based on the state of UE 110 prior to the link being opened.

Because cloud 130 may be implemented via a 5G MEC architecture, there may be virtually no latency between the actions occurring on UE 110 and the emulation of the actions on shadow UE 140. In addition, because shadow UE 140 is a replica of UE 110, it may not be possible for malicious parties/software to detect that shadow UE 140 is operating in an emulated environment. Currently, malware may be able to detect when the malware is running in an emulated environment and the malware may not release a malicious payload when it detects that it is running in the emulated environment. However, since shadow UE 140 is a replica of UE 110 and because there may be virtually no latency (or undetectable latency) between actions performed on UE 110 and the emulated actions performed on shadow UE 140, the malware may not be able to detect that shadow UE 140 is running in an emulated environment on cloud 130. In this way, the malware may release a malicious payload on shadow UE 140 and UE 110 may be protected from the malicious payload.

In addition, since shadow UE 140 is a replica of UE 110, a user of UE 110 may be able to access shadow UE 140 in the event that UE 110 is unavailable (e.g., UE 110 is lost or stolen). For example, if UE 110 is lost, a user of UE 110 may order a replacement UE. Before the replacement UE arrives, the user may be able to access shadow UE 140 through a web browser or via other means in order to access apps 150 and other information stored on UE 110. For example, if the user requires an app 150 stored on UE 110 to input a code for two-factor authorization to access the user's email services, the user may access the two-factor authorization app stored on shadow UE 140 to obtain the code. In addition, once the replacement UE arrives, the user may be able to transfer the exact state of UE 110 when UE 110 was lost from shadow UE 140 to the replacement UE. Since shadow UE 140 is a replica of UE 110, shadow UE 140 may store the most recent states and interactions that occurred with respect to UE 110.

As used herein, the term "user" is intended to be broadly interpreted to include UE 110 and/or a person using UE 110. Also, the terms "user," "owner," "consumer," "subscriber," and/or "customer" are intended to be used interchangeably.

The number of devices and/or networks, illustrated in FIG. 1, is provided for explanatory purposes only. In practice, additional devices and/or networks, fewer devices and/or networks, different devices and/or networks, or differently arranged devices and/or networks than those illustrated in FIG. 1 may be used. Also, in some implementations, one or more of the displayed devices or networks may perform one or more functions described as being performed by another one or more of the other devices or networks. The devices and networks shown in FIG. 1 may interconnect via wired connections, wireless connections, or a combination of wired and wireless connections.

Figure 2:
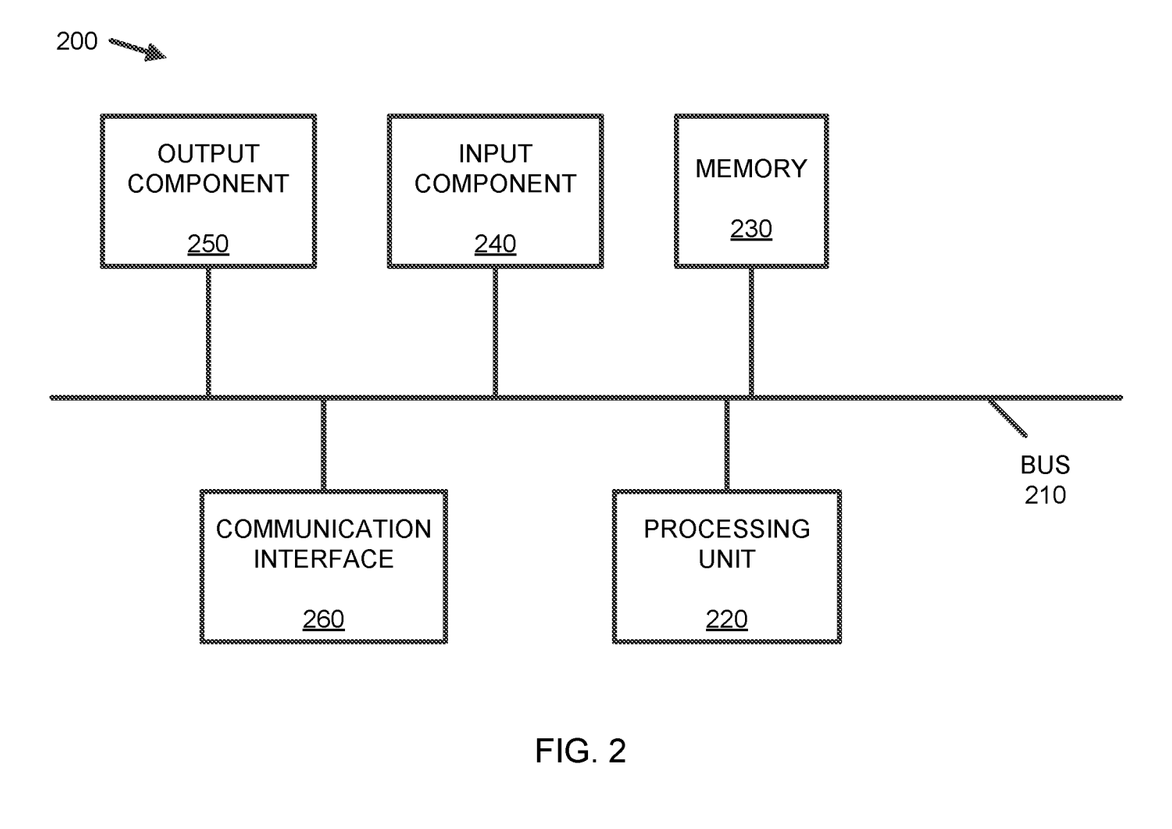
FIG. 2 is a diagram of exemplary components of a device that may be included in the environment shown in FIG. 1.

FIG. 2 is a diagram of exemplary components of a device 200 that may correspond to one of the components of UE 110, network 120, and/or cloud 130. As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, a microphone or the like. Output component 250 may include a device that outputs information to the operator, such as a display (e.g., a liquid crystal display), a printer, a speaker, a light emitting diode (LED), etc.

Communication interface 260 may include one or more transceivers that enables device 200 to communicate with other devices and/or systems. For example, communication interface 260 may include one or more radio frequency (RF) receivers, transmitters, and/or transceivers and or more antennas for transmitting and receiving data. Communication interface 260 may also include a modem or Ethernet interface to a LAN or other mechanism for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
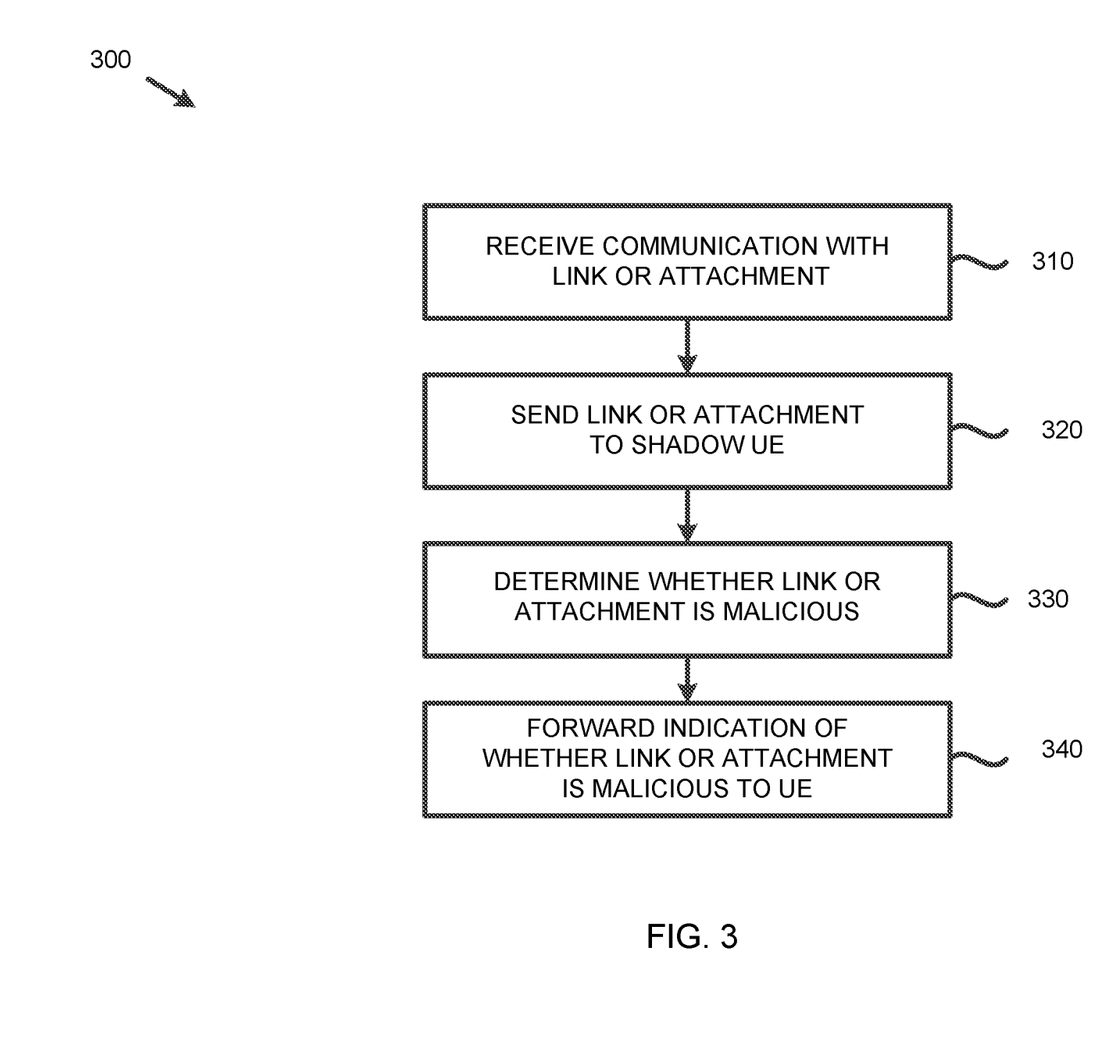
FIG. 3 is a flow chart of an exemplary process of determining whether a link or attachment is malicious.
Figure 4:
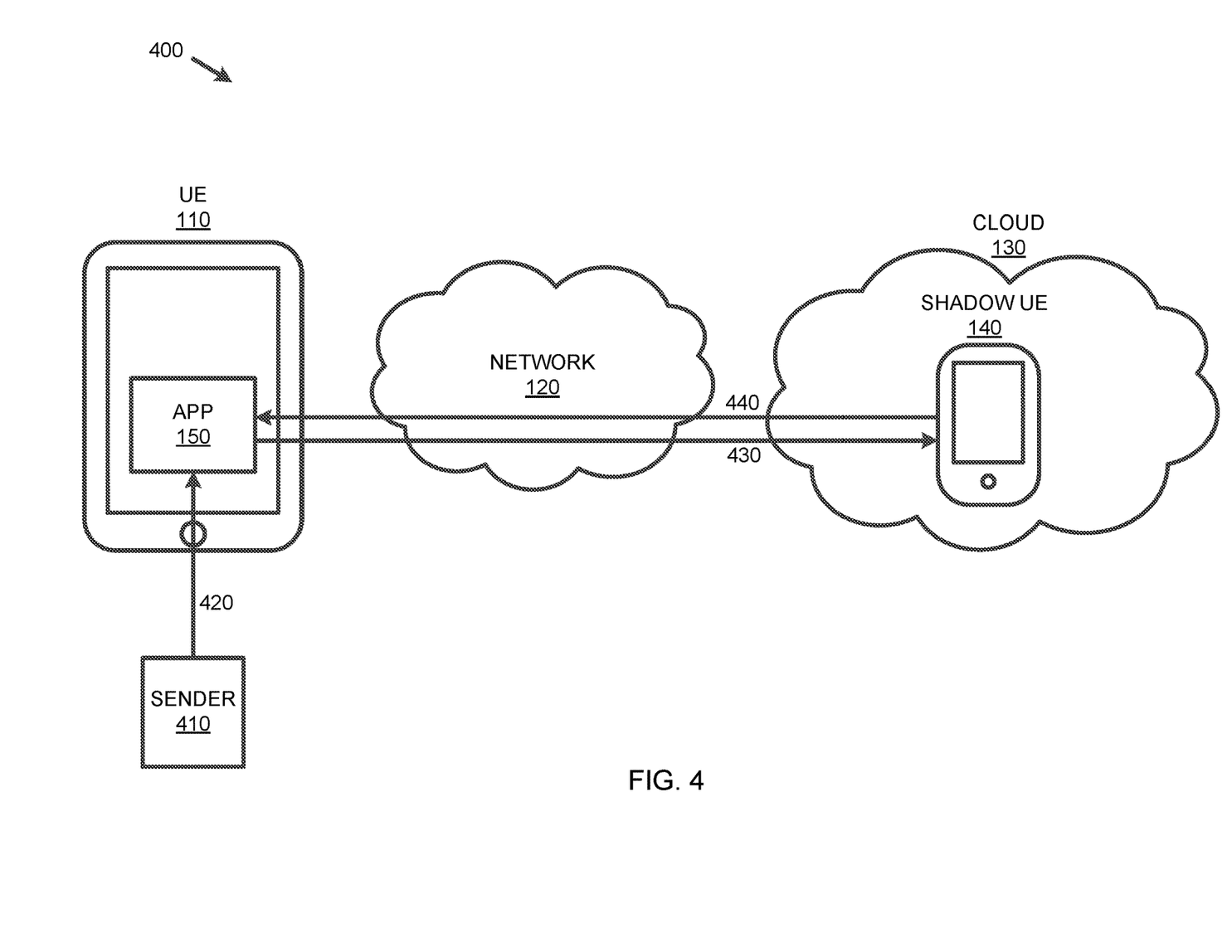
FIG. 4 is a diagram illustrating an exemplary environment associated with the process of FIG. 3.

FIG. 3 is a flow chart of an exemplary process 300 of determining whether a link or attachment is malicious. FIG. 4 is a diagram illustrating an exemplary environment 400 associated with the process of FIG. 3.

Process 300 may begin when UE 110 receives a communication from a sender containing a link or an attachment (block 310). As shown in FIG. 4, UE 110 may receive a link or attachment from sender 410 (420). For example, app 150 may include a mail app an electronic mail app 150 may receive an email with an attachment from sender 410. As another example, app 150 may include a text messaging app and text messaging app 150 may receive a text message including a link from sender 410.

Process 300 may continue when UE 110 sends the link or attachment to shadow UE 140 (block 320). For example, as shown in FIG. 4, UE 110 may forward the link or attachment to shadow UE 140 (430). In one implementation, UE 110 may automatically forward the link or attachment to shadow UE 140 prior to allowing the user to access the link or attachment. For example, app 150 may correspond to an email app, a text message app, an app associated with shadow UE 140, or another type of app and app 150 may flag the link or attachment as suspicious. App 150 may automatically forward the flagged link or attachment to shadow UE 140 without any user input. As another example, app 150 may automatically forward all links or attachments to shadow UE 140 prior to allowing the user to access the link or the attachment.

In another implementation, a user may request that the link or the attachment be forwarded to shadow UE 140 for inspection. For example, the user may receive a link or an attachment from sender 410 (e.g., via an email or a text message) and app 150 associated with shadow UE 140 may open on UE 110 and display a message indicating that the link or attachment may be malicious. App 150 may further provide the user with an option to send the link or attachment to shadow UE 140. The user may indicate via app 150 that the link or attachment should be sent to shadow UE 140. As another example, the user or UE 110 may receive the attachment or link and may determine that the link or the attachment may be malicious. In this case, the user may open app 150 associated with shadow UE 140 and request that UE 110 send the attachment or link to shadow UE 140.

Process 300 may continue when shadow UE 140 determines whether the link or the attachment is malicious (block 330). For example, shadow UE 140 may receive a link from UE 110 and may look up the link in a database to determine whether the link is known to be malicious or safe. For example, a database with known malicious and/or known safe links or destinations may be stored in cloud 130 or in another location. If the link or a portion of the link is in the database, shadow UE 140 may determine whether the link is malicious or safe. As another example, shadow UE 140 may be able to verify a certificate authenticity of a link, which may be effective against static low sophistication attacks, such as phishing sites. If shadow UE 140 verifies that a certificate associated with the link is authentic, shadow UE 140 may determine that the link is safe.

As another example, shadow UE 140 may receive the link or the attachment and may open the link or the attachment. Prior to opening the link or the attachment, shadow UE 140 may record and store the current state of UE 110. Shadow UE 140 may open the link or the attachment when the link is not found in the database or when shadow UE 140 is unable to determine the authenticity of the certificate associated with the link. Alternatively, shadow UE 140 may open the link or the attachment without looking up the link in the database or attempting to verify the authenticity of the certificate associated with the link.

In some instances, malware may be able to determine that it is running in a simulated environment. In these situations, the malware may not release the payload or interact with an operating system running on the simulated environment. Therefore, in these cases, a link or an attachment may be determined to be safe because the payload is not released. However, because shadow UE 140 is a replica of UE 110 and because there is virtually no latency between actions performed on UE 110 and the emulated actions performed on shadow UE 140, malware running on shadow UE 140 may not be able to detect that it is running in an emulated environment on cloud 130. That is, since shadow UE 140 has all of the characteristics of UE 110, the malware may not be able to determine that shadow UE 140 is not UE 110. Therefore, when shadow UE 140 opens a malicious link or attachment, the malware may release the malicious payload since the malware is unable to detect that shadow UE 140 is running in an emulated environment.

When shadow UE 140 opens the link or the attachment, if the attachment or the destination associated with the link contains malware, the malware may release a malicious payload on shadow UE 140. Since the malicious payload is released on shadow UE 140, UE 110 may be protected from the malicious payload. If a malicious payload is released, shadow UE 140 may determine that the link or the attachment is malicious and may prevent UE 110 from opening the malicious link or attachment. Since shadow UE 140 stored a state of UE 110 prior to opening the link or the attachment, UE 110 may continue operating based on the state before the link or the attachment was opened. If the attachment or the destination associated with the link does not contain malware, shadow UE 140 may determine that the link or the attachment is safe for UE 110 to open.

Process 300 may continue when shadow UE 140 forwards an indication of whether the link or the attachment is malicious to UE 110 (block 340). As shown in FIG. 4, shadow UE 140 may forward an indication of whether the link or attachment is malicious to UE 110 (440). If the link or the attachment is not malicious, UE 110 may display an indication that the link or the attachment is safe. For example, if shadow UE 140 determines that an email attachment is safe, email app 150 may display an indication near the attachment or near the email that the attachment is not malicious (e.g., a checkmark, an icon, changing a color of text associated with the attachment, a written indication that the attachment is safe, etc.). Similarly, if shadow UE 140 determines that a link embedded in a text message is safe, text message app 150 may display an indication near the text message or near the link that the link is safe.

If shadow UE 140 determines that the link or the attachment is malicious, app 150 associated with the link or the attachment may notify the user that the link or the attachment is malicious. For example, app 150 may display an indication near the link or the attachment that the link or the attachment is not safe and should not be opened. App 150 may further prevent the user from opening the link or attachment by automatically deleting the link or attachment. In one implementation, app 150 may delete the email or text message that contains the link or attachment to prevent the user from opening the malicious link or attachment. App 150 may further notify the user that shadow UE 140 has detected a malicious link or attachment and has deleted the link or the attachment and/or an email or text message associated with the malicious link or attachment. App 150 may additionally flag sender 410 of the malicious link or attachment and may forward all future received communications from sender 410 to shadow device 140. In addition, UE 110 may report the sender of the email or the text message, a website associated with the malicious link or the malicious attachment, or another entity associated with the malware to a third party, such as a network provider associated with network 120.

The method described above with respect to FIGS. 3 and 4 protects UE 110 from malicious links and/or attachments. Because shadow UE 140 runs on a 5G MEC platform (or a fast 4G platform), there may be virtually no latency between actions performed on UE 110 and shadow UE 140. Therefore, the process described above may be performed quickly and accurately to ensure that UE 110 is safe from malware attempting to harm UE 110.

Figure 5:
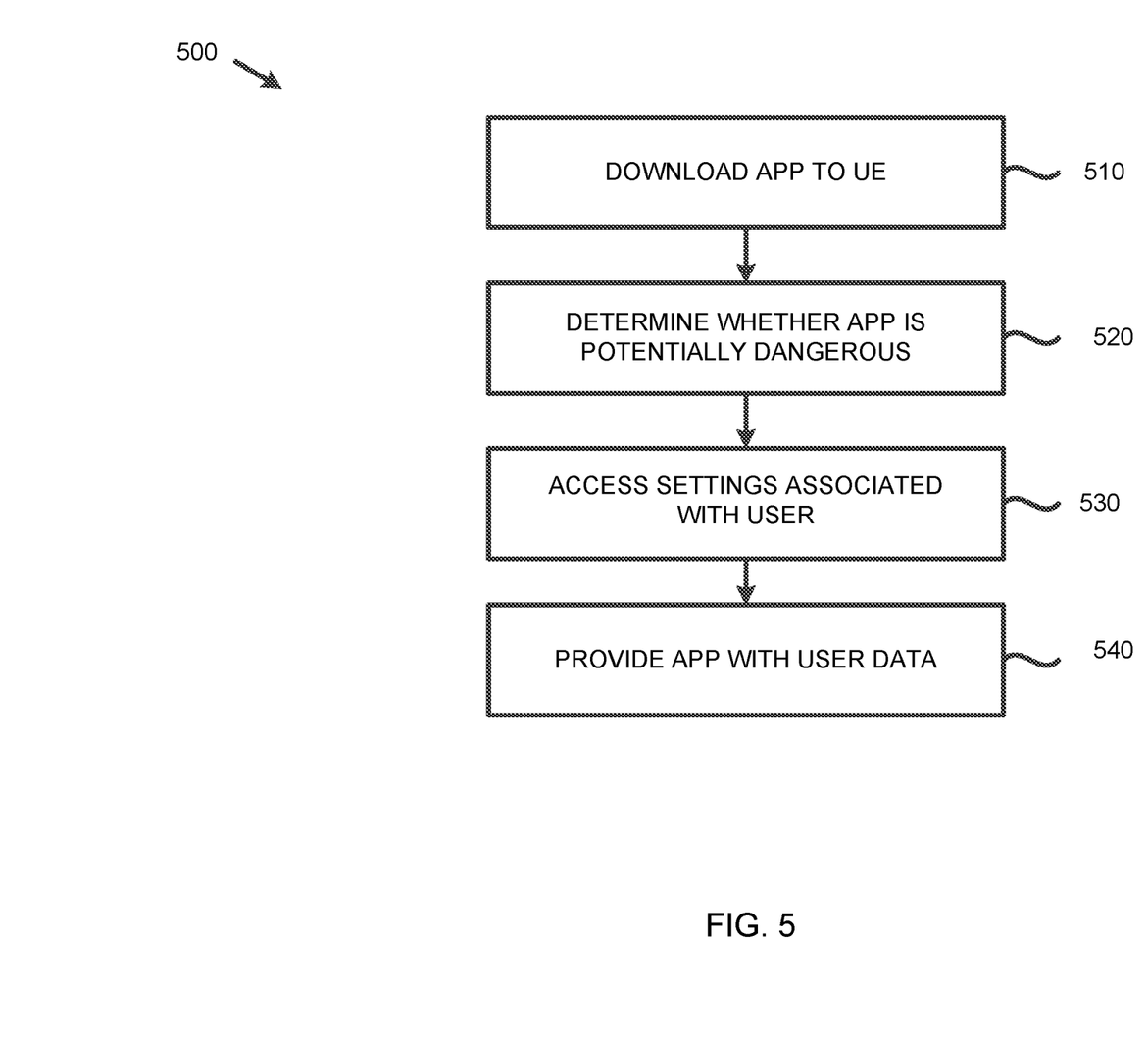
FIG. 5 is a flow chart of an exemplary process in which an application may be provided false information about a user.

FIG. 5 is a flow chart of an exemplary process 500 in which an app may be provided false information about a user. Process 500 may begin when a user accesses app 150 or downloads app 150 to UE 110 (block 510). For example, a user may open an app store affiliated with UE 110 and may download app 150 to UE 110. Alternatively, a user may visit a third-party app store or a website to download app 150. Additionally, a user may access app 150 via a second application stored on UE 110. For example, app 150 may include a third-party app, such as a quiz app, that is granted access to information about the user and/or UE 110 via a social media application downloaded on UE 110.

Process 500 may continue when shadow UE 140 performs an assessment on app 150 to determine whether app 150 is potentially dangerous or harmful or whether app 150 has been compromised (block 520). Since shadow UE 140 emulates the actions of UE 110, when app 150 is downloaded to UE 110, shadow UE 140 may have access to app 150. A potentially dangerous or harmful application may misuse user information after being installed on UE 110. For example, app 150 may sell user information or contact information to a third party or otherwise leak a user's privacy information. In these instances, a user may not want to provide app 150 with legitimate user information if app 150 is potentially dangerous. In addition, app 150 may become compromised and behave in an inappropriate manner. For example, app 150 may become compromised by malware attempting to perform exfiltration of data from UE 140. In this instance, a user may want to provide app 150 with dummy data that can be tagged and traced.

Some websites may provide modified versions of existing applications that request many permissions. For example, app 150 may include a third-party app that was created by a developer that is not the manufacturer of UE 110 or the owner of the website that offers app 150. A third-party app may require that a user of UE 110 permit the third-party app to access information about the user and UE 110. The permissions requested by app 150 may include access to a user's location, personal information, contact information, history, an address or identifier associated with UE 110, etc. Shadow UE 140 may perform a risk assessment on app 150 to determine whether app 150 is potentially malicious or dangerous. For example, shadow UE 140 may analyze who made or distributed app 150 to determine whether app 150 is potentially dangerous. In addition, shadow UE 140 may determine that app 150 is potentially dangerous based on a number of permissions that app 150 requests from the user. Shadow UE 140 may also determine that app 150 is potentially dangerous by looking up app 150 in a database of potentially dangerous applications, and/or other ways. In addition, shadow UE 140 may determine that app 150 has been compromised when app 150 behaves in an inappropriate manner. For example, shadow UE 140 may determine that app 150 has been compromised if app 150 attempts to perform exfiltration of data from UE 140.

Process 500 may continue when shadow UE 140 accesses settings associated with the user (block 530). A user may provide preferences regarding information to be sent to app 150 based on a risk associated with app 150. For example, during registration, a user may be provided with a user interface to configure settings regarding privacy information associated with the user or UE 110.

For example, a user may indicate that if there is no risk associated with the app 150, shadow UE 140 may provide legitimate information about the user to app 150. The user may further indicate that if app 150 is potentially dangerous, fake or dummy data should be provided to app 150. In addition, the user may indicate that some legitimate information and some fake information may be provided to app 150. In this instance, a user may determine which legitimate information (e.g., user name) should be provided to app 150 and which fake information (e.g., user information) may be provided to app 150. A user may further indicate that legitimate, but non-specific information may be provided to app 150. For example, a user may opt to provide a current country or state where the user is located as geolocation information instead of providing a more specific address, such as a city or street. Alternatively, the user may indicate that fake or dummy data should be provided to all apps 150. When a user indicates that fake or dummy data should be provided, the user may choose the fake or dummy data to provide. Alternatively, the user may indicate that random fake or dummy data may be provided.

In addition, a user may choose to provide legitimate contact information that is unused by the user. For example, a user may wish to access content behind an access wall that requires that the user input contact information, such as a telephone number or email address. A user may indicate that a legitimate email address or telephone number that is not typically used by the user may be provided in order to access the content. In addition, during the initial registration, a user may provide more than one email address or telephone number. For example, the user may indicate that if app 150 is not suspicious, a first email address should be provided to app 150. In addition, the user may indicate that if app 150 is potentially dangerous, a second email address should be provided to app 150. In this case, the user may be able to access emails sent to both email addresses, but may use the second email address for receiving ads, coupons, etc. In this way, a potentially dangerous application may not have access to an email address associated with the user that may contain private information. Additionally, a user's primary email address may not be inundated with unwanted emails or spam.

In one implementation, the dummy data may include false contact information associated with the user. For example, the dummy data may include a false email address or a false phone number. The dummy data may additionally include fake geolocation data associated with the user. The dummy information may further include a fake contact list and fake information associated with the contacts on the fake contact list. In addition, the dummy information may include a fake browsing history or a fake profile associated with the user.

The dummy data may further include fake information associated with UE 110, such as a fake Internet Protocol (IP) address. IP address spoofing may include creating IP packets with a false source IP address for the purpose of impersonating another computing system. IP address spoofing may involve the use of a trusted IP address by network intruders to overcome network security measures, such as authentication based on IP addresses. In order to prevent an IP address associated with UE 110 to be used for illegitimate purposes, a user of UE 110 may not want to provide a legitimate IP address when app 150 is potentially dangerous. In addition, a user may wish to provide other false information associated with UE 110. Therefore, the dummy data may include a fake IP address, a false phone number, a false International Mobile Equipment Identifier (IMEI), or another fake address or identifier associated with UE 110.

In addition, a user may choose to provide dummy data when app 150 has been compromised. In this case, a user may additionally choose to provide dummy data that has been tagged and can be traced. For example, if app 150 has been compromised by malware and is attempting to exfiltrate data from UE 110, a user may choose to provide tagged dummy data to app 150. In this way, the tagged dummy data may be traced to potentially determine who is attempting to exfiltrate the data from UE 140.

Process 500 may continue when shadow UE 140 provides app 150 with data associated with the user and/or UE 110 based on the risk assessment and the settings information (block 540). For example, based on the settings, when shadow UE 140 determines that app 150 is not dangerous, shadow UE 140 may provide app 150 with legitimate user information. In another example, shadow UE 140 may determine that app 150 is potentially dangerous and not secure. In this instance, based on the user's settings, shadow 140 may provide app 150 with dummy data when app 150 is potentially dangerous. For example, if shadow UE 140 determines that app 150 is potentially dangerous and app 150 requests user geolocation data and contact information, shadow UE 140 may provide app 150 with fake or nonspecific geolocation data and fake contact information based on the user's settings. In this way, a user may feel secure that his or her personal information is secure from potentially malicious applications.

The method described above with respect to FIG. 5 may allow a user to maintain security and privacy when app 150 is downloaded to UE 110. The method may further prevent the user from experiencing annoyances such as unwanted telephone calls, telemarketer calls, unwanted emails, and spam emails. The method may additionally protect a user's contacts from being targeted by malicious or unwanted communications.

Figure 6:
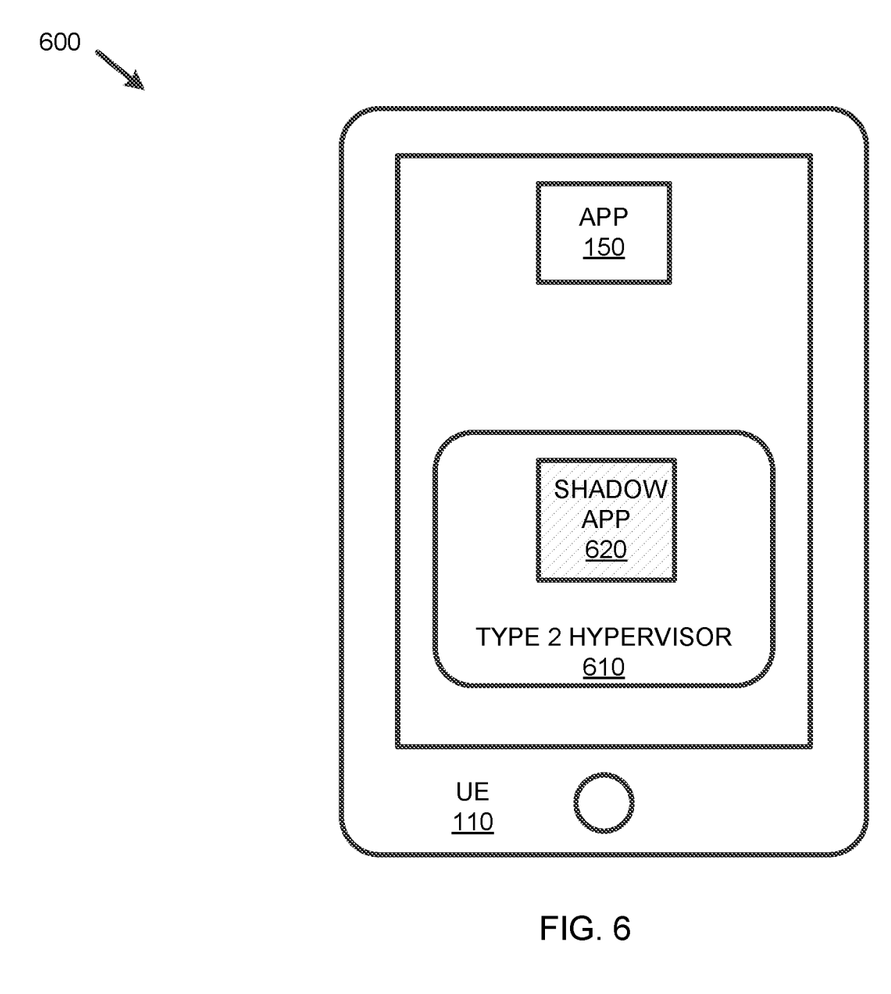
FIG. 6 is a diagram showing an embodiment in which a hypervisor may be used for detecting malicious links or attachments.

FIG. 6 is a diagram showing an embodiment 600 in which a hypervisor, such as a type 2 hypervisor, may be used for detecting malicious links or attachments. Environment 600 may include UE 110, app 150, type 2 hypervisor 610, and shadow app 620.

In one implementation, when 5G or a fast 4G platform is not available due to a user's location or for another reason, a user may be unable to access shadow UE 140. When a user is downgraded to a slower network, latency issues may prevent the user from accessing shadow UE 140. In this situation, a user may continue to monitor links and attachments using type 2 hypervisor 610 on UE 110. Type 2 hypervisor 610 may include a software version of a hypervisor that may run on UE 110. As shown in FIG. 6, type 2 hypervisor 610 may include a shadow app 620 that emulates app 150. Shadow app 620 may be identical to app 150 and actions performed with respect to app 150 may be performed on shadow app 620. Shadow app 620 may be used in a manner similar to shadow UE 140 to open suspicious links or attachments received by app 150.

For example, when app 150 is an email app and app 150 receives a communication, such as an email with an attachment, app 150 may send the attachment to shadow app 620. As another example, when app 150 is a text message app and app 150 receives a text message with an embedded link, app 150 may send the link to shadow app 620. Shadow app 620 may determine whether the link or attachment is malicious in a manner similar to the manner discussed with respect to FIGS. 3 and 4 in which shadow UE 140 determined whether a link or attachment is malicious. For example, shadow app 620 may open a suspicious link or attachment and a malicious payload may be released on shadow app 620 instead of app 150. In this way, UE 110 may be protected from the malware since the malicious payload has not been released on app 150.

As shown in FIG. 6, instead of running app 150 via shadow UE 140 from cloud 130, app 150 may be running directly as shadow app 620 on UE 110 through type 2 hypervisor 610. In this manner, a user may continue to be secure when the user is unable to access shadow UE 140 on a 5G MEC platform or other fast computing platform (e.g., LTE).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
receiving, at a user device associated with a user, a communication containing a link associated with a destination;
accessing, by the user device, an application via the destination;
sending, by the user device, the link to a virtual user device stored externally with respect to the user device, wherein actions to be performed by the user device using the application are executed on the virtual user device, and wherein the virtual user device determines a risk that the application is potentially malicious;
receiving, at the user device, an indication of the risk that the application is potentially malicious; and
providing, by the user device, user-configured setting information indicating multiple types of data that the virtual user device provides to the application according to the indicated risk and responsive to a request from the application, wherein the multiple types of data relate to at least one of the user or the user device and include specific legitimate information, false information, and non-specific legitimate information.

2. The method of claim 1, wherein receiving the indication includes receiving the indication in response to the virtual user device performing a lookup in a database to determine whether the application is malicious.

3. The method of claim 1, wherein receiving the indication includes receiving the indication in response to the virtual user device selecting the link to determine whether the application is malicious.

4. The method of claim 1, further comprising:
downloading, by the user device, the application, wherein the virtual user device provides randomly-generated false information associated with the at least one of the user or the user device to the application.

5. The method of claim 1, further comprising:
receiving a second communication that contains at least one of a second link or a second an attachment;
determining that a multi-access edge computing (MEC) platform implementing the virtual user device is unavailable;
sending the second link or the attachment to a hypervisor on the user device; and
receiving an indication from the hypervisor whether the second link or the attachment is potentially malicious.

6. The method of claim 1, further comprising:
preventing the link from being opened when the risk indicates that the application is potentially malicious.

7. The method of claim 1, further comprising:
deleting the communication when the risk indicates that the application is potentially malicious.

8. A device comprising:
a memory configured to store instructions; and
a processor configured to execute the instructions to:
receive, from a user device associated with a user, an indication of one or more actions performed with respect to the user device;
execute the one or more actions so that the device is synchronized with the user device;
receive, from the user device, a communication containing a link associated with a destination, wherein an application is accessible to the user device via the destination;
determine a risk that the application is potentially malicious; and
provide, to the application based on user-configured setting information, multiple types of data according to the indicated risk and responsive to a request from the application, wherein the multiple types of data relate to at least one of the user or the user device and include specific legitimate information, false information, and non-specific legitimate information.

9. The device of claim 8, wherein, when determining the risk, the processor is further configured to perform a lookup in a database to determine whether the application is potentially malicious.

10. The device of claim 8, wherein, when determining the risk, the processor is further configured to select the link to determine whether the application is potentially malicious.

11. The device of claim 8, wherein, when determining the risk, the processor is further configured to determine whether a certificate associated with the link is authentic.

12. The device of claim 8, wherein the processor is further configured to:
randomly generate the false information.

13. The device of claim 8, wherein the processor is further configured to:
tag the false information so the false information can be traced;
determine whether the application has been compromised;
provide the false information associated with the user device to the application when the application has been compromised; and
trace the false information.

14. The device of claim 8, wherein the device is implemented on a multi-access edge computing (MEC) platform.

15. A non-transitory computer-readable medium containing instructions, the instructions comprising:
one or more instructions that, when executed by a processor associated with a virtual device, cause the processor to:
receive, from a user device associated with a user, an indication of one or more actions performed with respect to the user device;
execute the one or more actions so that the virtual device is synchronized with the user device;
receive, from the user device, a communication containing a link associated with a destination, wherein an application is accessible to the user device via the destination;
determine a risk that the application is potentially malicious; and
provide, to the application based on user-configured setting information, multiple types of data according to the indicated risk and responsive to a request from the application, wherein the multiple types of data relate to at least one of the user or the user device and include specific legitimate information, false information, and non-specific legitimate information.

16. The non-transitory computer-readable medium of claim 15, wherein the one or more instructions that cause the processor to determine the risk comprise one or more instructions that cause the processor to perform a lookup in a database to determine whether the application is potentially malicious.

17. The non-transitory computer-readable medium of claim 15, wherein the one or more instructions that cause the processor to determine the risk comprise one or more instructions that cause the processor to select the link to determine whether the application is potentially malicious.

18. The non-transitory computer-readable medium of claim 15, wherein the one or more instructions that cause the processor to determine the risk comprise one or more instructions that cause the processor to determine whether a certificate associated with the link is authentic.

19. The non-transitory computer-readable medium of claim 15, wherein the instructions further comprise instructions that cause the processor to:

randomly generate the false information.

20. The non-transitory computer-readable medium of claim 15, wherein the virtual device is implemented on a multi-access edge computing (MEC) platform.

* * * * *